US009223418B2

(12) United States Patent
Bohn et al.

(10) Patent No.: US 9,223,418 B2
(45) Date of Patent: Dec. 29, 2015

(54) PEN DIGITIZER (75) Inventors: David D. Bohn, Fort Collins, CO (US); Derek Leslie Knee, Fort Collins, CO (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 754 days.

(21) Appl. No.: 12/968,654

(22) Filed: Dec. 15, 2010

(65) Prior Publication Data

US 2012/0153026 A1 Jun. 21, 2012

(51) Int. Cl.
*G06K 7/10* (2006.01)
*G06F 3/033* (2013.01)
*G06F 3/037* (2013.01)
*G06F 3/0354* (2013.01)
*G06F 3/03* (2006.01)
*G02B 6/04* (2006.01)
*G02B 6/36* (2006.01)
*G02B 6/42* (2006.01)

(52) U.S. Cl.
CPC .......... *G06F 3/03545* (2013.01); *G06F 3/0321* (2013.01); *G06K 7/10* (2013.01); *G02B 6/04* (2013.01); *G02B 6/3624* (2013.01); *G02B 6/4298* (2013.01)

(58) Field of Classification Search
CPC ....... G06K 7/10; G06F 3/0317; G06F 3/0321; G06F 3/033; G06F 3/0346
USPC ............. 235/472.01–472.03, 462.01–462.49; 250/227.13; 345/179, 180; 382/313, 382/314
See application file for complete search history.

(56) References Cited

U.S. PATENT DOCUMENTS

| 3,932,022 | A | * | 1/1976 | Henning et al. | ......... 250/227.11 |
| 5,051,736 | A | | 9/1991 | Bennett et al. | |
| 5,072,409 | A | | 12/1991 | Bottorf et al. | |
| 5,331,435 | A | * | 7/1994 | Scott | ............................. 358/479 |
| 5,506,394 | A | * | 4/1996 | Plesko | ..................... 235/462.46 |
| 6,747,599 | B2 | | 6/2004 | McEwan | |
| 6,756,970 | B2 | | 6/2004 | Keely et al. | |
| 7,124,952 | B2 | * | 10/2006 | Tan et al. | .................. 235/472.01 |

(Continued)

FOREIGN PATENT DOCUMENTS

| CN | 1495665 | 5/2004 |
| CN | 101257545 | 9/2008 |

(Continued)

OTHER PUBLICATIONS

Scholey, Lan, "Inductive Pen Sensing vs. Resistive Input Technology", Retrieved at << http://www.pencomputing.com/features/wacom_digitizer_comparison.html >>, Retrieved Date: Nov. 12, 2010, pp. 4.

(Continued)

*Primary Examiner* — Thien M Le
*Assistant Examiner* — April Taylor
(74) *Attorney, Agent, or Firm* — Micah Goldsmith; Judy Yee; Micky Minhas (57) ABSTRACT In embodiments, a pen digitizer includes a light source that generates light. The pen digitizer also includes light guides, such as fiber optics, configured coaxial within the pen digitizer to transfer the light from the light source and focus the light around an imaging tip of the pen digitizer. A photo array optically-images reflected light from encoded bits in an encoded micro pattern, and a lens focuses the reflected light onto the photo array.

20 Claims, 8 Drawing Sheets

(56) References Cited

U.S. PATENT DOCUMENTS

| | | | |
|---|---|---|---|
| 7,343,042 | B2 | 3/2008 | Braun et al. |
| 7,622,182 | B2 | 11/2009 | Wang et al. |
| 7,656,396 | B2 | 2/2010 | Bosch et al. |
| 8,009,893 | B2 | 8/2011 | Rhoads et al. |
| 8,066,184 | B2 | 11/2011 | Chung et al. |
| 2002/0035321 | A1 | 3/2002 | Bucholz et al. |
| 2004/0041798 | A1* | 3/2004 | Kim .................... 345/179 |
| 2004/0077964 | A1 | 4/2004 | Nakai et al. |
| 2004/0086181 | A1 | 5/2004 | Wang et al. |
| 2004/0195310 | A1 | 10/2004 | Silverbrook et al. |
| 2006/0139338 | A1 | 6/2006 | Robrecht et al. |
| 2006/0151610 | A1* | 7/2006 | Chiang et al. ........ 235/472.03 |
| 2006/0176287 | A1 | 8/2006 | Pittel et al. |
| 2008/0204429 | A1 | 8/2008 | Silverbrook et al. |
| 2011/0310720 | A1* | 12/2011 | Lapstun et al. ............ 369/69 |
| 2012/0162145 | A1 | 6/2012 | Knee |

FOREIGN PATENT DOCUMENTS

| | | |
|---|---|---|
| CN | 201489546 | 5/2010 |
| JP | 60183691 A * | 9/1985 |

OTHER PUBLICATIONS

"Detailed Drawing and Digitizing Tables", Retrieved at << http://www.atariarchives.org/cgp/Ch03_Sec08.php >>,, Computer Graphics Primer, Retrieved Date: Nov. 12, 2010, pp. 7.

"DuoSense® Pen, Touch & Multi-Touch Digitizer", *N-trig*, Available at <http://www.n-trig.com/Data/Uploads/Misc/DuoSense010609Broch.pdf>,(Jun. 2009),4 pages.

"Interactive whiteboard", Retrieved from: <http://www.articlesbase.com/sales-articles/interactive-whiteboard-2892485.html> on Aug. 30, 2010, (Jul. 24, 2010),5 pages.

"Wacom Generation 2 Tip Sensor", *Wacom Technology Corporation*, Available at <http://www.wacom.com/generation2/>,(Mar. 25, 2009),2 pages.

Wu, Xiaojie "Achieving Interoperability of Pen Computing with Heterogeneous Devices and Digital Ink Formats", *Thesis, University of Western Ontario Faculty of Graduate Studies*, Available at <http://www.orcca.on.ca/penmath/materials/theses/XiaojieWuMSc2004.pdf>,(Dec. 2004),80 pages.

"Non-Final Office Action", U.S. Appl. No. 12/977,987, (May 14, 2013), 9 pages.

"Non-Final Office Action", U.S. Appl. No. 12/977,987, (Nov. 21, 2012), 8 pages.

"Foreign Office Action", CN Application No. 201110436624.4, Feb. 19, 2014, 12 Pages.

"Final Office Action", U.S. Appl. No. 12/977,987, Oct. 23, 2013, 10 pages.

"Foreign Office Action", CN Application No. 201110443159.7, Mar. 28, 2014, 14 pages.

"Foreign Office Action", CN Application No. 201110436624.4, Sep. 12, 2014, 14 Pages.

"Foreign Office Action", CN Application No. 201110443159.7, Sep. 2, 2014, 17 Pages.

"Non-Final Office Action", U.S. Appl. No. 12/977,987, Feb. 12, 2015, 10 pages.

"Foreign Office Action", CN Application No. 201110443159.7, Feb. 4, 2015, 12 Pages.

"Foreign Office Action", CN Application No. 201110436624.4, Mar. 27, 2015, 9 Pages.

"Final Office Action", U.S. Appl. No. 12/977,987, Jul. 13, 2015, 14 pages.

"Foreign Notice of Allowance", CN Application No. 201110443159.7, Aug. 17, 2015, 4 Pages.

"Foreign Office Action", CN Application No. 201110436624.4, Sep. 28, 2015, 9 pages.

* cited by examiner

PEN DIGITIZER

BACKGROUND

A digitizer is used to generate a digital representation of an image by converting analog signals into digital signals. A digital pen can be used to image handwriting, such as when a user marks on a digitizer pad with a digital pen and the marks are digitized. The digital data that represents the handwriting can be stored in the digital pen and then downloaded to a computer that processes the digital data to generate a display of the handwriting as an image or graphic on a display device. A digitizer pad is typically configured as an M×N sensor array with a large number of signal connections to the digitizer pad so that an (x,y) position of a handwriting mark on the digitizer pad can be determined, and then resolved for display.

A digital signal processor receives data signal inputs from the signal connections to the M×N sensor array and utilizes a large amount of processing resources, such as power and CPU resources, to resolve M×N sensor inputs into an (x,y) position of a handwriting mark. As the size and area of a digitizer pad is increased, the signal connections needed for the sensor array, and the processing resources needed to resolve position data, exponentially increases. The large number of signal connections needed for a sensor array, the additional power needs, and/or processor limitations are all factors that limit conventional digitizer techniques, particularly for resolution and accuracy on larger displays.

SUMMARY

This summary is provided to introduce simplified concepts of an encoded micro pattern and a pen digitizer that are further described below in the Detailed Description. This summary is not intended to identify essential features of the claimed subject matter, nor is it intended for use in determining the scope of the claimed subject matter.

In embodiments, an encoded micro pattern includes segments of encoded bits that can be optically-imaged by a pen digitizer. The position of each segment in the encoded micro pattern can be determined from the encoded bits that are unique to a segment. Each of the segments of the encoded micro pattern also includes a fiducial marker that indicates an orientation of a segment in the encoded pattern. The encoded bits of the encoded micro pattern can be integrated into a display surface of a display device, or integrated in a display screen that is positioned over the display surface of a display device.

In other embodiments, a pen digitizer includes a light source that generates light. The pen digitizer also includes light guides, such as fiber optics, configured coaxial within the pen digitizer to transfer the light from the light source and focus the light around an imaging tip of the pen digitizer. A photo array optically-images reflected light from encoded bits in the encoded micro pattern, and a lens focuses the reflected light onto the photo array.

BRIEF DESCRIPTION OF THE DRAWINGS

Embodiments of an encoded micro pattern and a pen digitizer are described with reference to the following drawings. The same numbers are used throughout the drawings to reference like features and components.

DETAILED DESCRIPTION

An encoded micro pattern and a pen digitizer are described. In embodiments, an encoded micro pattern can be integrated into a display surface of a display device, or integrated in a display screen that is positioned over the display surface of a display device. The encoded micro pattern is easily scalable and can be used for various sizes of displays, such as from a small phone display, to a portable laptop, to an LCD display, and for the size of a large whiteboard.

The encoded micro pattern includes segments of encoded bits that can be optically-imaged by a pen digitizer, and the position of each segment in the encoded micro pattern can be determined independently from the encoded bits that are unique to a particular segment. Processing resources are not exponentially increased as the size of the encoded micro pattern increases based on the size of a display device. A computing device utilizes approximately the same processing resources, such as power and CPU resources, independent of whether the encoded micro pattern is implemented for a small display device or a large display device. Additionally, the encoded micro pattern is a passive, non-powered digitizer pattern, while the pen digitizer is powered to illuminate the encoded bits so that they are detectable and can be optically-imaged when the light is reflected back along the optical axis of the pen digitizer.

While features and concepts of the described systems and methods for an encoded micro pattern and a pen digitizer can be implemented in any number of different environments, systems, devices, and/or various configurations, embodiments of an encoded micro pattern and a pen digitizer are described in the context of the following example devices, systems, and configurations.

Figure 1:
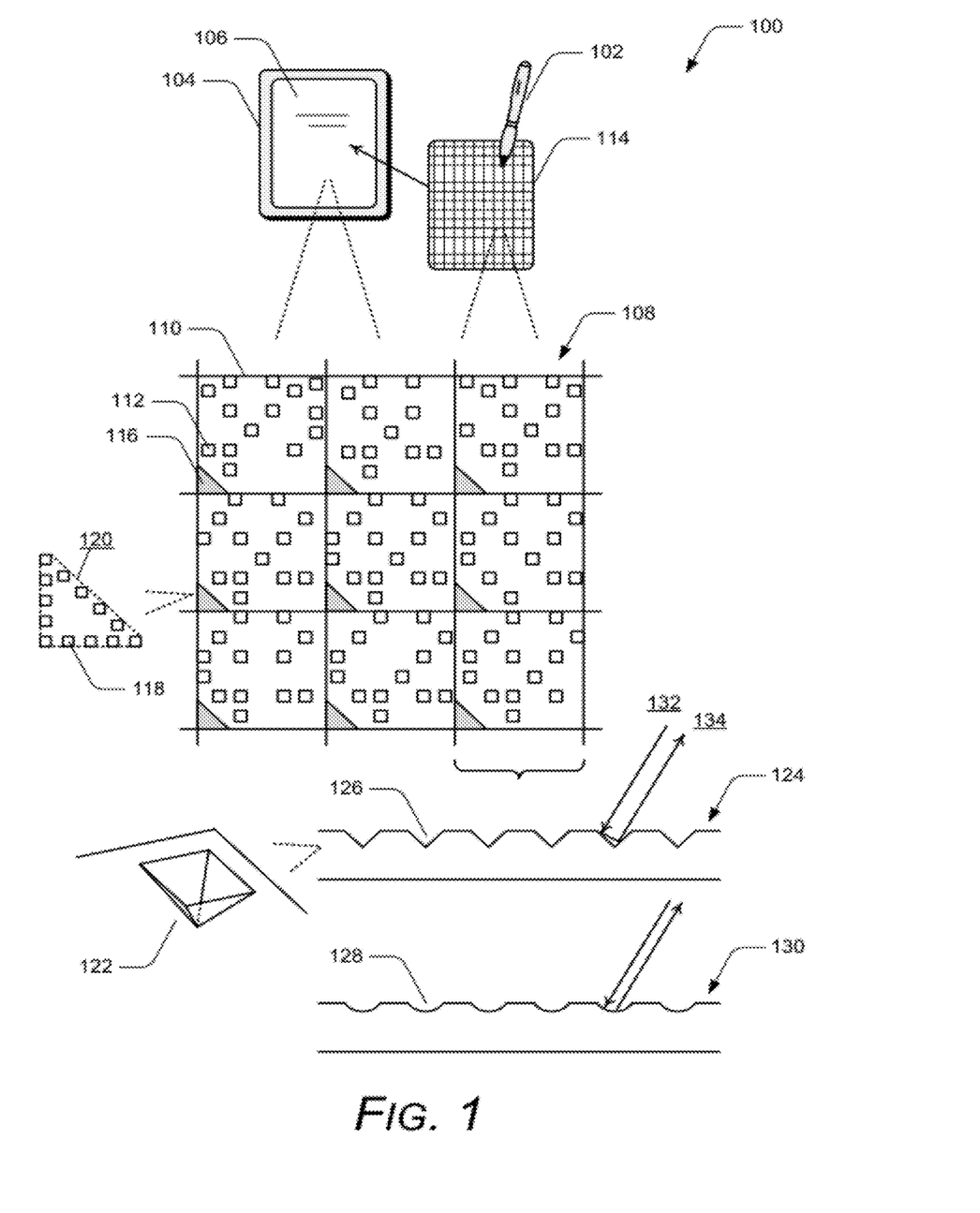
FIG. 1 illustrates an example digitizer system in which embodiments of an encoded micro pattern and a pen digitizer can be implemented.

FIG. 1 illustrates an example digitizer system 100 in which various embodiments of an encoded micro pattern and a pen digitizer can be implemented. The digitizer system 100 includes a pen digitizer 102 and computing device 104 with an integrated display device 106. The computing device can be any type of fixed or portable device that may be wired or wireless, and includes an integrated display device or is connected to a display device. In embodiments, the computing device can be any one or combination of a tablet computer, electronic paper, portable computer, mobile phone, media player, smart television, display panel, and/or any other type of device configured for wireless data communication with the pen digitizer 102. The techniques for an encoded micro pattern and a pen digitizer described herein can be used for various sizes of displays, such as from a small phone display, to a portable laptop, to an LCD display, and for the size of a large whiteboard.

The digitizer system 100 also includes an encoded micro pattern 108 that includes segments 110 of encoded bits 112. The encoded micro pattern can be integrated into a display surface of the display device 106. Alternatively, the encoded micro pattern can be integrated in a display screen 114 that is sized and designed to position over the display surface of the display device 106. The display screen can be implemented to add digitizer functionality to virtually any type of device. In an embodiment, a segment 110 of the encoded micro pattern can be implemented as a thirty-six (36) bit array of 6×6 encoded bits for a 2048×2048 resolution digitizer, and the segment may optionally include sixteen (16) additional encoded bits for an error-correction code (ECC). The 6×6 pattern can be encoded into a 80 µm×80 µm area at a resolution of three-hundred (300) dpi without interpolation. A segment of the encoded micro pattern can be implemented with more or less of the encoded bits 112 to allow less or more light through the encoded micro pattern so that a displayed image is viewable on the display device. In this example, the encoded micro pattern 108 is illustrated with large encoded bits merely for discussion. In practice, the encoded bits encompass only a small percentage of segment area, and may not be visually perceptible to a user when viewing an image displayed on the display device through the encoded micro pattern.

The position of a segment in the encoded micro pattern is determinable from the encoded bits in a segment. In embodiments, the encoded bits in a segment indicate an (x,y) position of the segment in the encoded micro pattern, which also corresponds to a display location on the display device when the encoded micro pattern is integrated with the display device. The encoded bits can include position determinable bits from which the position of a segment in the encoded micro pattern is determined. For example, a simple encoded micro pattern might include a segment with no encoded bits to indicate the (x,y) position (0,0); a segment with one encoded bit to indicate the (x,y) position (0,1); a segment with two encoded bits to indicate the (x,y) position (1,0); and so on. Generally, more complicated coding schemes with any number, combination, and arrangement of encoded bits can be used to designate the positions of segments in the encoded micro pattern. In embodiments, the encoded bits can also include error-correction bits that may be utilized to verify the determined position of a segment in the encoded micro pattern. Additional encoded bits may be included in a segment to represent other information, such as any type of an application interpreted instruction.

Note that the position of a segment 110 in the encoded micro pattern 108 (or on the display device) is not determined based on a conventional M×N sensor array, which typically requires a large number of signal connections and utilizes a large amount of processing resources, such as power and CPU resources, to resolve M×N sensor inputs into an (x,y) position of a handwriting mark. Rather, the position of each segment 110 in the encoded micro pattern 108 can be determined independently from the encoded bits 112 that are unique to a particular segment. Processing resources of the computing device 104 are not exponentially increased as the size of the encoded micro pattern increases based on the size of a display device, such as from the size of a mobile phone to the size of a tablet computer, or even a large LCD. The computing device that processes the segment data for an imaged segment of encoded bits utilizes approximately the same processing resources independent of whether the encoded micro pattern is implemented for a small display device or a large display device.

In this example of the encoded micro pattern 108, each of the segments include a fiducial marker 116 that indicates an orientation of the segment 110 in the encoded micro pattern. The fiducial marker indicates the orientation of the segment so that the encoded bits 112 are interpreted in a correct sequence or pattern at the computing device to determine the (x,y) position of the segment in the encoded micro pattern. When the encoded bits of a segment are optically-imaged by the pen digitizer 102 to generate a segment image, the image is processed to generate segment data that is then communicated to the computing device 104.

The segment data is processed by the computing device to determine the position of the segment in the encoded micro pattern, as indicated by the encoded bits of the imaged segment. Correspondingly, the computing device 104 can generate a written image for display on the display device 106 at the position that corresponds to the segment in the encoded micro pattern. Additionally, the written image that is displayed on the display device can be generated in approximate real-time when the segment is optically-imaged by the pen digitizer as a user writes with the pen digitizer 102 on the display device 106 (or on the display screen 114 that is positioned over the display device).

In this example, each segment 110 of the encoded micro pattern 108 is shown as an approximate square segment, and each square segment includes a fiducial marker 116 positioned to indicate the orientation of a segment. Although the segments of the encoded micro pattern are shown as approximate square segments, the encoded micro pattern may be designed with segments, regions, areas, and/or groups that include a related set of encoded bits that indicate a determinable position in the encoded micro pattern. Additionally, the fiducial markers may be designed in any configuration of various shapes and/or images that are distributed to each indicate the orientation of a segment when processing segment data to determine the position of a segment in the encoded micro pattern. In practice, a fiducial may not be a separate shape in a segment of the encoded micro pattern. For example, a designated group of fiducial bits 118 can be arranged in a formation 120 that is easily detected in a segment of the encoded micro pattern, and unique enough so as not to be interpreted as part of the encoded bit pattern. Rather than the fiducial marker 116, the encoded bits of the segment 110 may include fiducial bits from which the fiducial marker of the segment can be determined, and the orientation of the segment is indicated by the fiducial bits.

The encoded bits of the encoded micro pattern 108 are designed to be optically-imaged by the pen digitizer 102. The encoded micro pattern is a passive, non-powered digitizer pattern, while the pen digitizer 102 is powered to illuminate the encoded bits so that they are detectable and can be optically-imaged when the encoded bits reflect light back along the optical axis of the pen digitizer. The encoded bits can be formed as negative features in the display surface of the display device 106 or in the display screen 114, and may be silver coated, mirror coated, or similarly treated to improve reflection.

In an implementation, the encoded bits can be formed as a negative pyramid 122 in a display surface 124 (or display screen), as shown in a side view of encoded bits formed as negative pyramids 126. Alternatively, the encoded bits may be formed as a hemisphere divot 128 in a display surface 130 (or display screen). When light at 132 is directed from the pen digitizer 102 to illuminate the encoded micro pattern, the light is reflected at 134 by the encoded bits that are formed as the negative pyramids, or similarly, the light is reflected by the encoded bits that are formed as the hemisphere divots. In implementations, the display surfaces 124 and 130 for example, can be formed with the encoded bits and then covered with a protective layer or film to keep the encoded bits from collecting debris that may limit the ability to reflect light.

Figure 2:
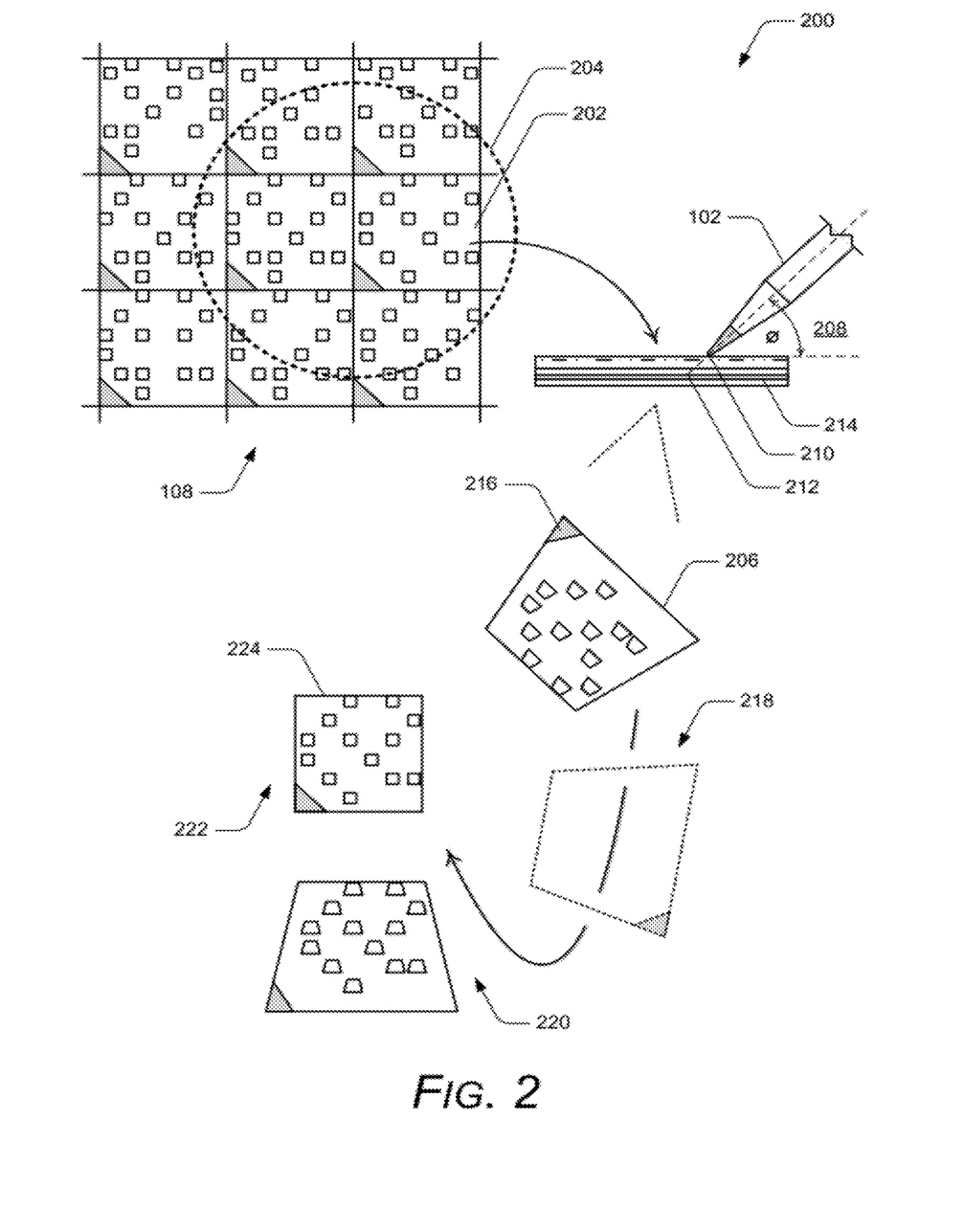
FIG. 2 illustrates an example of an encoded micro pattern in accordance with one or more embodiments.

FIG. 2 illustrates an example 200 of the encoded micro pattern 108 as described with reference to FIG. 1, and digitizing a segment 202 of the encoded micro pattern in accordance with the various embodiments described herein. The encoded bits and fiducial marker of the segment 202 are optically-imaged with the pen digitizer 102 to generate a segment image 204. In an implementation, imaging with the pen digitizer encompasses at least two segments of the encoded micro pattern in any direction, and it doesn't matter which way the pen digitizer is held or rotated by a user when the segment is optically-imaged. The pen digitizer is implemented with a high enough resolution that is operable to discern the encoded micro pattern, and imaging the encoded micro pattern is independent from the orientation of the pen digitizer to the pattern.

In this example, the segment image 204 that includes segment 202 is optically-imaged as a segment trapezoid 206 with image distortion when the pen digitizer is positioned at a tilt angle 208 with respect to a plane of the encoded micro pattern. For example, a user may hold the pen digitizer at any angle when writing with the pen digitizer, and the user may notice a parallax error as a depth-of-field discrepancy between where the pen digitizer contacts a display surface or display screen at 210 and where the written image is displayed at 212 by the display device 214. For example, a user may notice the parallax error when the imaging tip of the pen digitizer on the display surface doesn't match up with a point that a user intended to contact on a displayed page or image.

As described with reference to FIG. 1, the pen digitizer 102 optically-images the segment and generates segment data from the segment image. The segment data is then communicated to the computing device that processes the segment data to determine a position of the segment in the encoded micro pattern. In this example, the segment trapezoid 206 is processed to orientate the segment image based on a fiducial marker 216 that indicates an orientation of the segment when the computing device processes the segment data. The image of the segment trapezoid may be rotated, flipped, and/or squared to orientate the encoded bits of the segment so that the encoded bits are interpreted in a correct sequence or pattern to determine the (x,y) position of the segment in the encoded micro pattern. For example, the segment trapezoid 206 is flipped at 218 and rotated at 220 to orientate the segment image and position the fiducial marker as shown in the encoded micro pattern 108.

The segment trapezoid 206 can then be squared at 222 to generate a squared segment image 224, which can then be processed to determine a position of the segment in the encoded micro pattern. Additionally, the tilt angle 208 can be determined from the segment trapezoid 206 and/or calculated based on the transition from the segment trapezoid to the squared segment image. A higher resolution 3x spatial oversampling can be used when processing the segment data to determine the tilt angle. A written image can then be displayed at 212 on the display device 214 with a parallax correction based on the tilt angle 208 of the pen digitizer.

Figure 3:
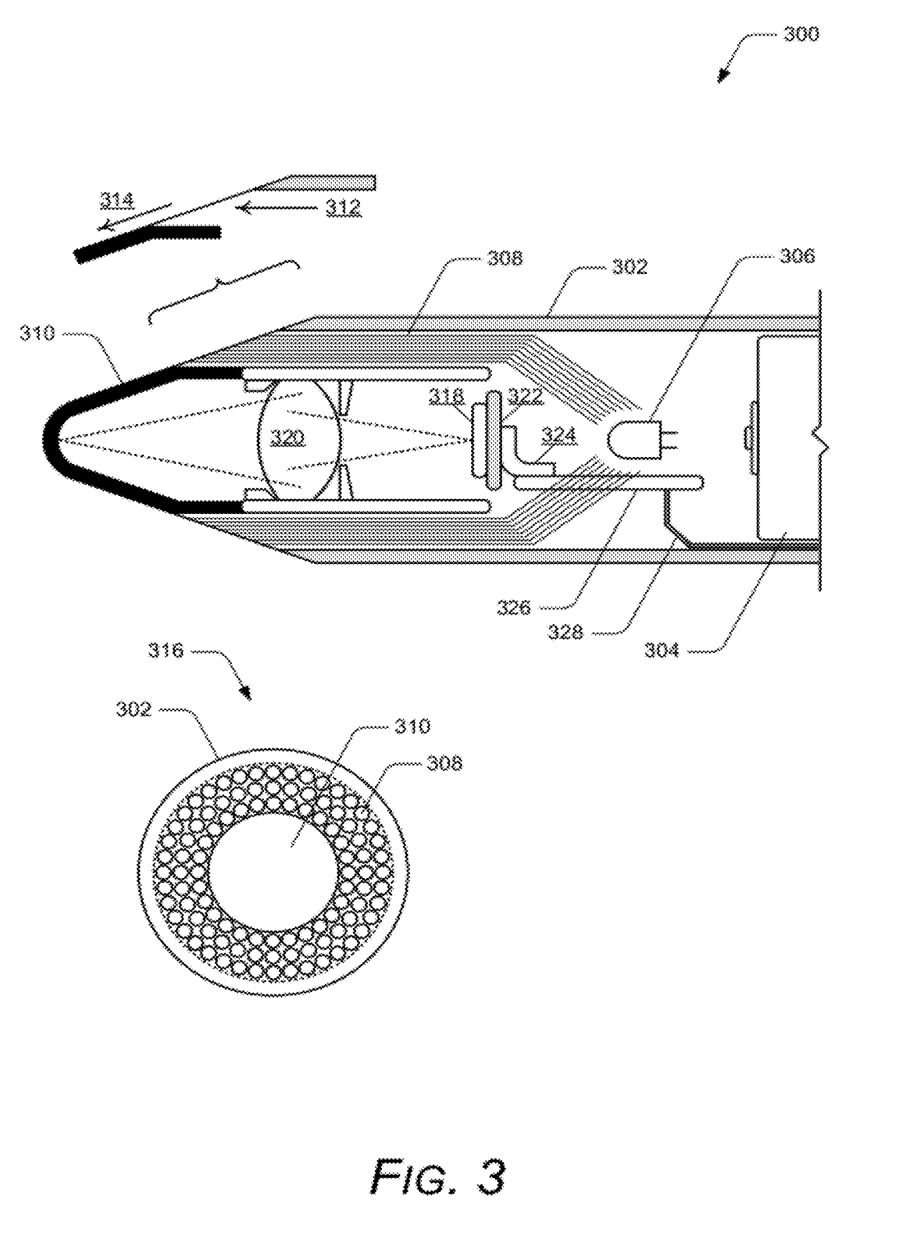
FIG. 3 illustrates an example of a pen digitizer in accordance with one or more embodiments.

FIG. 3 illustrates an example of a pen digitizer 300 in accordance with various embodiments described herein. The pen digitizer has a housing 302 that has a form factor and is approximately the size of a conventional writing pen, and an interior diameter of the housing is approximately no larger than the diameter of a battery 304 that powers the pen digitizer. The battery may be no bigger than a AAAA battery which has a relatively small diameter, and is shown near the imaging end of the pen digitizer for discussion purposes to illustrate the relative diameter of the pen digitizer housing. In practice, the battery can be located and accessed at the other end of the pen digitizer.

The pen digitizer 300 includes a light source 306, such as an LED or an infra-red (IR) laser, to generate light that illuminates the encoded bits in the encoded micro pattern. The light source can be implemented for all colors and wavelengths, and can be operable for any type of molecular reflectors, such as quantum dots and other types of nano-structures that may be incorporated or embedded as part of the encoded micro pattern. The light is reflected to image the encoded micro pattern, and may also include regenerated light from the nano-structures.

The pen digitizer also includes light guides 308 that are configured coaxial within the housing 302 of the pen digitizer. The light guides are configured to transfer the light from the light source to focus the light around an imaging tip 310 of the pen digitizer through which the encoded bits of a segment in the encoded micro pattern are imaged. In embodiments, the light guides are implemented as fiber optics. Alternatively or in addition, the light guides can be implemented as internal channels that may be molded within the housing of the pen digitizer. The light guides are also designed to refract the light 312 where the light exits a light guide, and the refracted light 314 further illuminates the encoded micro pattern around the imaging tip. An end view 316 of the pen digitizer further illustrates the housing 302 and the light guides 308 that encircle the imaging tip 310 to uniformly distribute the light all of the way around the imaging tip so that a user can hold and rotate the pen digitizer in any direction. The configuration of the light source and the fiber optics in the pen digitizer is merely illustrative of one optical-mechanical configuration. Other configurations may implement the concept of imaging an encoded micro pattern with reflected light and fiber optics.

The pen digitizer 300 also includes a photo array 318 that optically-images reflected light from the encoded bits of the encoded micro pattern when a lens 320 focuses the reflected light from the encoded bits onto the photo array. The photo array can be implemented as a two-dimension imager array of 51×51 pixels and circuit board 322 that is electrically coupled at 324 to a digital signal processor 326. In this example, the photo array and circuit board are positioned perpendicular to the digital signal processor within the housing of the pen digitizer. The digital signal processor receives a segment image of the encoded bits from the photo array and generates segment data that represents the encoded bits of the segment that is imaged. The pen digitizer 300 also includes a transmitter (not shown) that can then communicate the segment data to a computing device that processes the segment data to determine a position of the segment in the encoded micro pattern. The digital signal processor is electrically coupled at 328 to the transmitter, such as an RF transmitter, Bluetooth, or other wireless transmitter, which may be located near the other end of the pen digitizer along with the battery.

Figure 4:
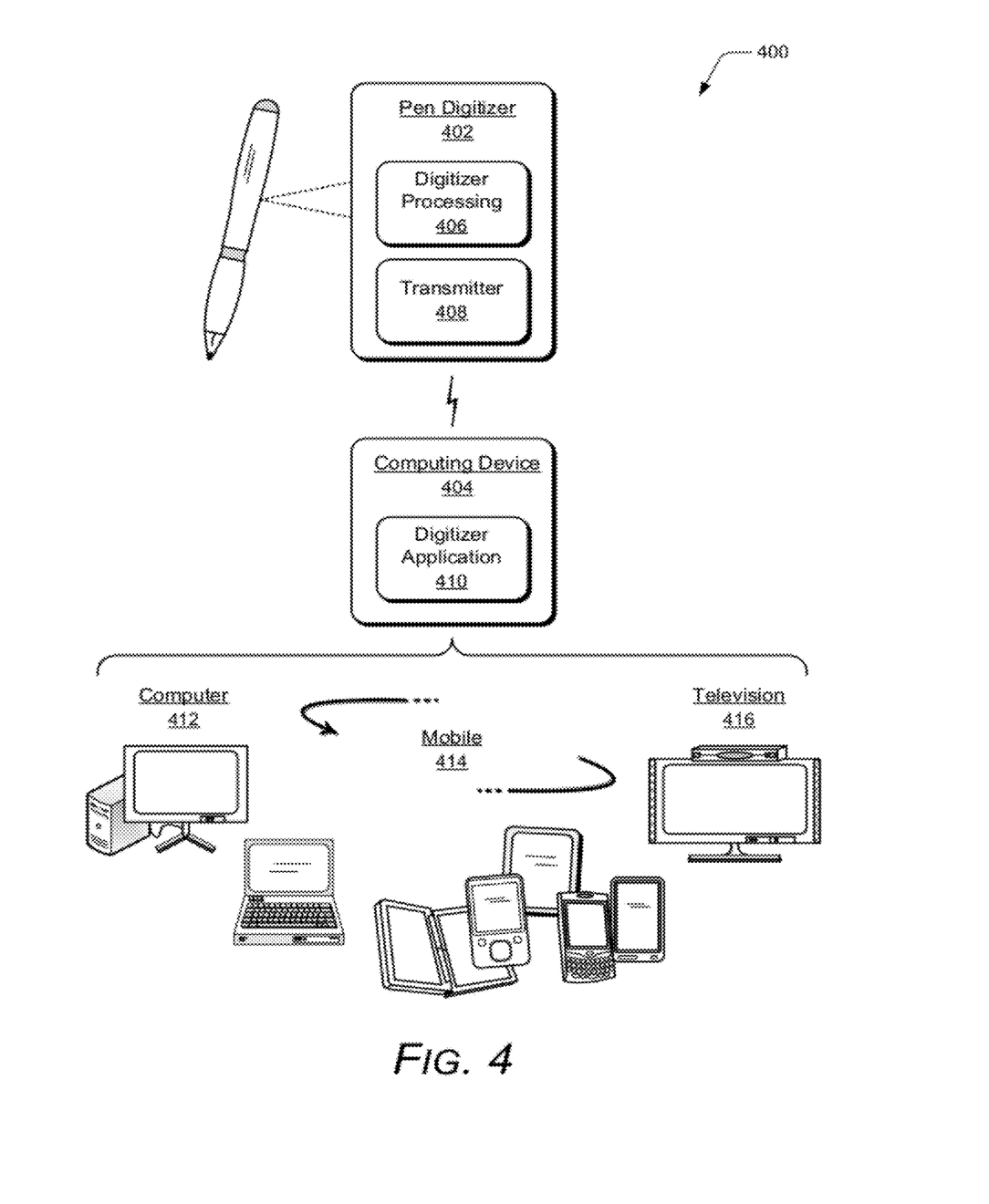
FIG. 4 illustrates an example system with multiple devices in which embodiments of an encoded micro pattern and a pen digitizer can be implemented.

FIG. 4 illustrates an example system 400 that includes a pen digitizer 402 and a computing device 404 as described with reference to the previous FIGS. 1-3. In this example system 400, the pen digitizer includes digitizer processing 406, which encompasses the components of a pen digitizer as described with reference to FIG. 3. For example, the digitizer processing can include a photo array that optically-images reflected light from the encoded bits, and a digital signal processor. The pen digitizer also includes a transmitter 408, such as an RF, Bluetooth, or other wireless device implemented for data communication to the computing device.

The computing device 404 includes a digitizer application 410 that can be implemented as computer-executable instructions, such as a software application, and executed by one or more processors to implement the various embodiments described herein. For example, the digitizer application is implemented to process segment data received from the pen digitizer to orientate a segment image, square the segment image, determine a tilt angle of the pen digitizer when the segment is optically-imaged, and/or determine a position of the segment in the encoded micro pattern. In an embodiment, the pen digitizer 402 may include the digitizer application 410 and correspondingly, process the segment image as described with reference to the digitizer application. Additionally, the computing device 404 may be implemented with any number and combination of differing components as further described with reference to the example device shown in FIG. 8.

The computing device 404 may be implemented in a variety of different configurations, such as for computer 412, mobile 414, and television 416 uses. For example, the computing device may be implemented as any type of a personal computer, desktop computer, a multi-screen computer, laptop computer, tablet, netbook, and so on. The computing device may also be implemented as any type of mobile device, such as a mobile phone, portable music player, portable gaming device, a tablet computer, a multi-screen computer, and so on. The computing device may also be implemented as any type of television device having or connected to generally larger display screens. The techniques described herein may be supported by these various configurations of the computing device and are not limited to the specific examples described herein.

Example methods 500, 600, and 700 are described with reference to respective FIGS. 5, 6, and 7 in accordance with one or more embodiments of an encoded micro pattern and a pen digitizer. Generally, any of the functions, methods, procedures, components, and modules described herein can be implemented using software, firmware, hardware (e.g., fixed logic circuitry), manual processing, or any combination thereof. A software implementation represents program code that performs specified tasks when executed by a computer processor. The example methods may be described in the general context of computer-executable instructions, which can include software, applications, routines, programs, objects, components, data structures, procedures, modules, functions, and the like. The program code can be stored in one or more computer-readable memory devices, both local and/or remote to a computer processor. The methods may also be practiced in a distributed computing environment by multiple computer devices. Further, the features described herein are platform-independent and can be implemented on a variety of computing platforms having a variety of processors.

Figure 5:
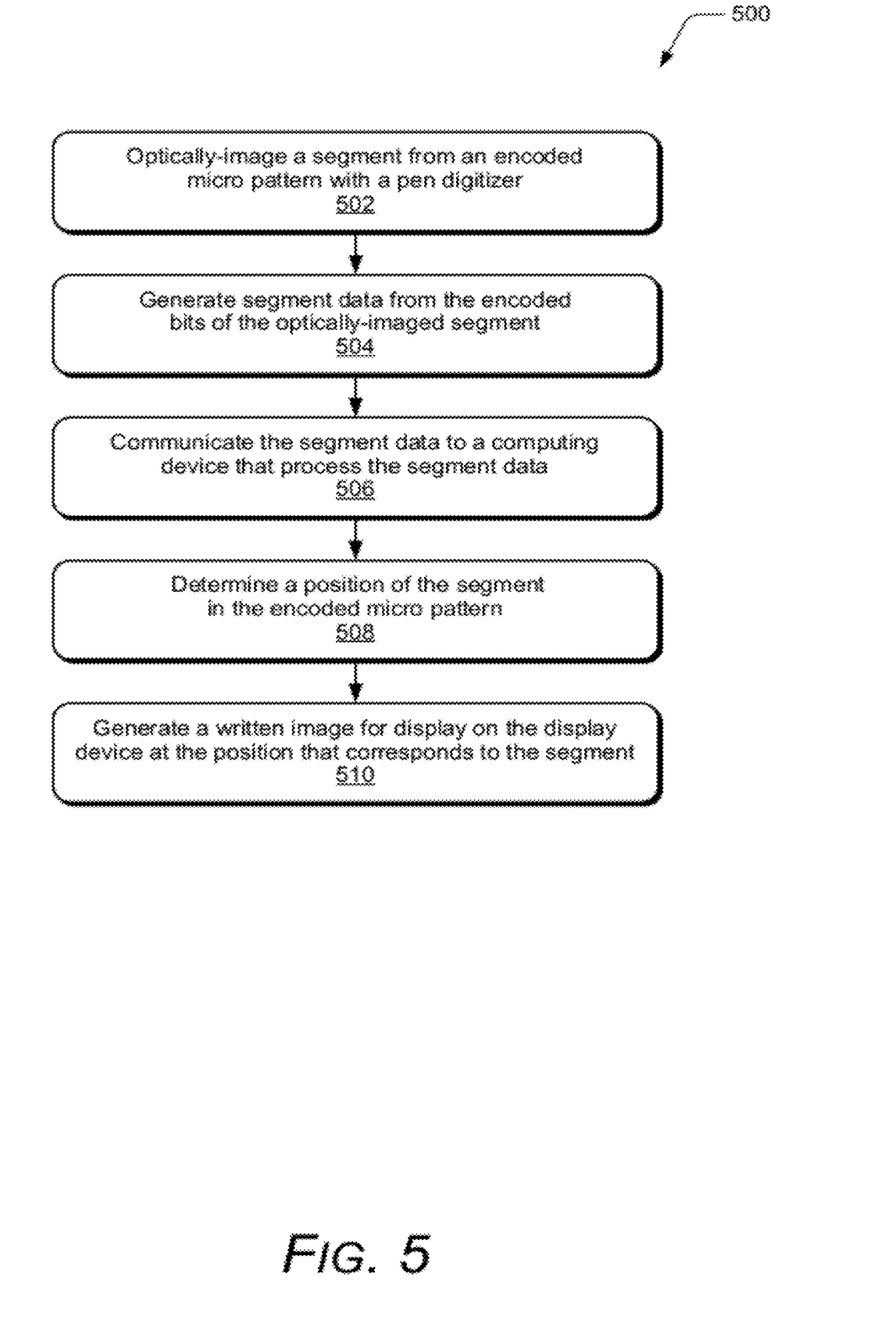
FIGS. 5-7 illustrate example method(s) of an encoded micro pattern and a pen digitizer in accordance with one or more embodiments.

FIG. 5 illustrates example method(s) 500 of an encoded micro pattern and a pen digitizer, and is described with reference to a digitizer system. The order in which the method blocks are described are not intended to be construed as a limitation, and any number of the described method blocks can be combined in any order to implement a method, or an alternate method.

At block 502, a segment image from an encoded micro pattern is optically-imaged with a pen digitizer. For example, the pen digitizer 102 (FIG. 1) optically-images a segment image 204 (FIG. 2) of the encoded micro pattern 108. The encoded micro pattern includes segments 110 of encoded bits 112, and a position of each segment in the encoded micro pattern is determinable from the encoded bits of a segment. In embodiments, the segment is optically-imaged as the segment trapezoid 206 when the pen digitizer is positioned at a tilt angle 208 with respect to a plane of the encoded micro pattern. Optically-imaging segments of the encoded micro pattern is further described with reference to FIG. 6.

At block 504, segment data is generated from the encoded bits of the optically-imaged segment and, at block 506, the segment data is communicated to a computing device that processes the segment data. For example, the pen digitizer 102 generates segment data from the segment image, and communicates the segment data to the computing device 104 that processes the segment data to determine a position of the segment in the encoded micro pattern.

At block 508, a position of the segment in the encoded micro pattern is determined and, at block 510, a written image is generated for display on a display device at the position that corresponds to the segment. For example, the computing device 104 determines the position of the segment 110 in the encoded micro pattern 108 from the encoded bits 112 in the segment. In embodiments, the encoded bits in a segment indicate an (x,y) position of the segment in the encoded micro pattern, which also corresponds to a display location on the display device. Accordingly, the computing device generates a written image for display on the display device 106 at the position that corresponds to the segment.

Figure 6:
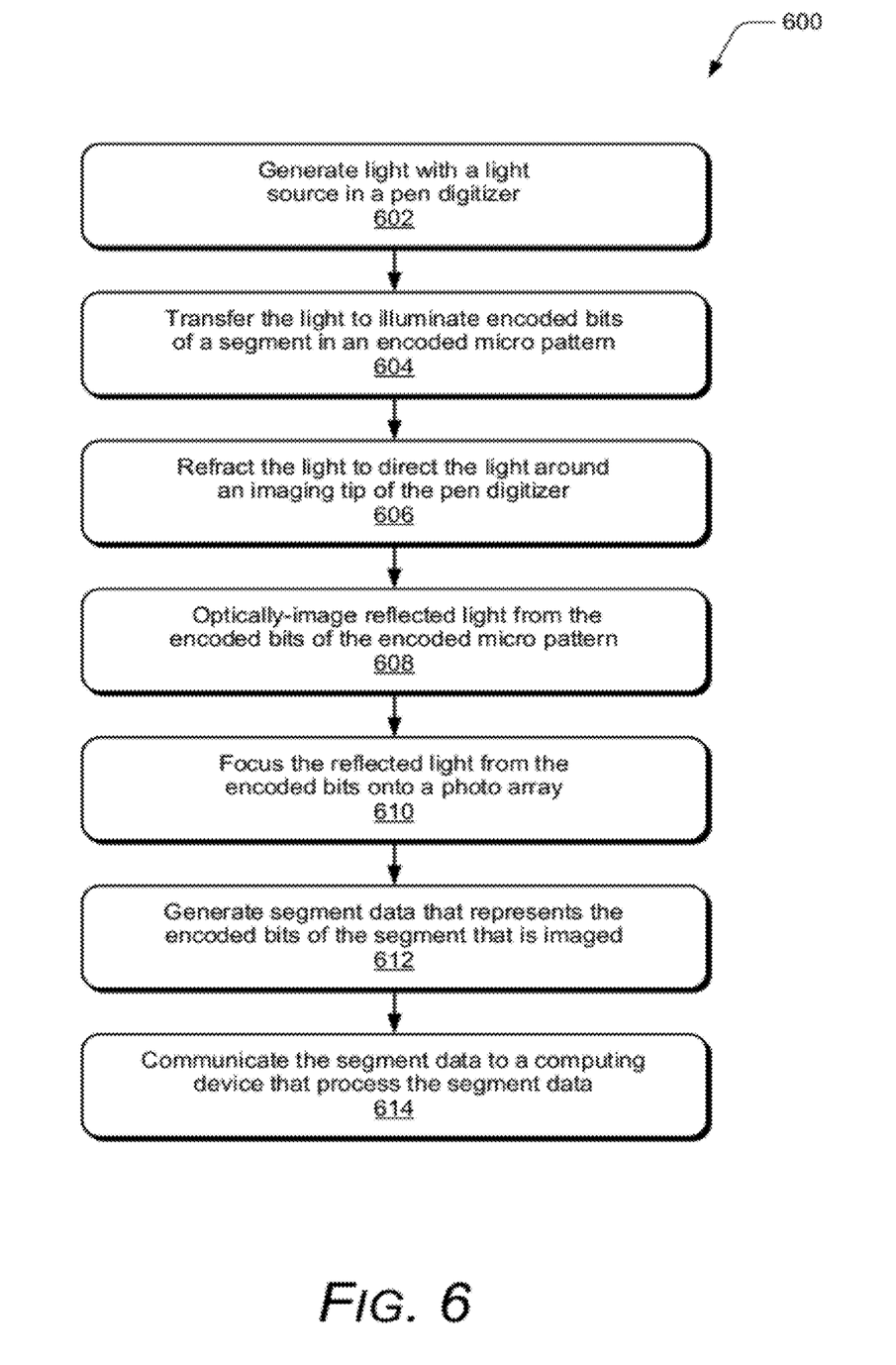

FIG. 6 illustrates example method(s) 600 of an encoded micro pattern and a pen digitizer, and is described with reference to a pen digitizer that optically-images segments of the encoded micro pattern. The order in which the method blocks are described are not intended to be construed as a limitation, and any number of the described method blocks can be combined in any order to implement a method, or an alternate method.

At block 602, light is generated with a light source in a pen digitizer and, at block 604, the light is transferred to illuminate encoded bits of a segment in an encoded micro pattern. For example, the pen digitizer 300 (FIG. 3) includes the light source 306, such as an LED or an infra-red (IR) laser, that generates light to illuminate the encoded bits 112 in the encoded micro pattern 108. The light guides 308, implemented as fiber optics or internal channels molded within the housing 302, are configured coaxial within the housing of the pen digitizer and transfer the light from the light source to focus the light around the imaging tip 310 of the pen digitizer.

At block 606, the light is refracted to direct the light around an imaging tip of the pen digitizer. For example, the light guides refract the light 312 where the light exits a light guide, and the refracted light 314 is directed to further illuminate the encoded micro pattern around the imaging tip 310 of the pen digitizer 300. At block 608, reflected light from the encoded bits of the encoded micro pattern is optically-imaged and, at block 610, the reflected light from the encoded bits is focused onto the photo array. For example, the photo array 318 of the pen digitizer 300 optically-images reflected light from the encoded bits 112 of the encoded micro pattern 108 when the lens 320 focuses the reflected light from the encoded bits onto the photo array.

At block 612, segment data that represents the encoded bits of the segment that is imaged is generated and, at block 614, the segment data is communicated to a computing device that processes the segment data to determine a position of the segment in the encoded micro pattern. For example, the digital signal processor 326 in the pen digitizer 300 generates segment data from the segment image, and a transmitter in the pen digitizer communicates the segment data to the computing device 104 that processes the segment data to determine a position of the segment in the encoded micro pattern.

Figure 7:
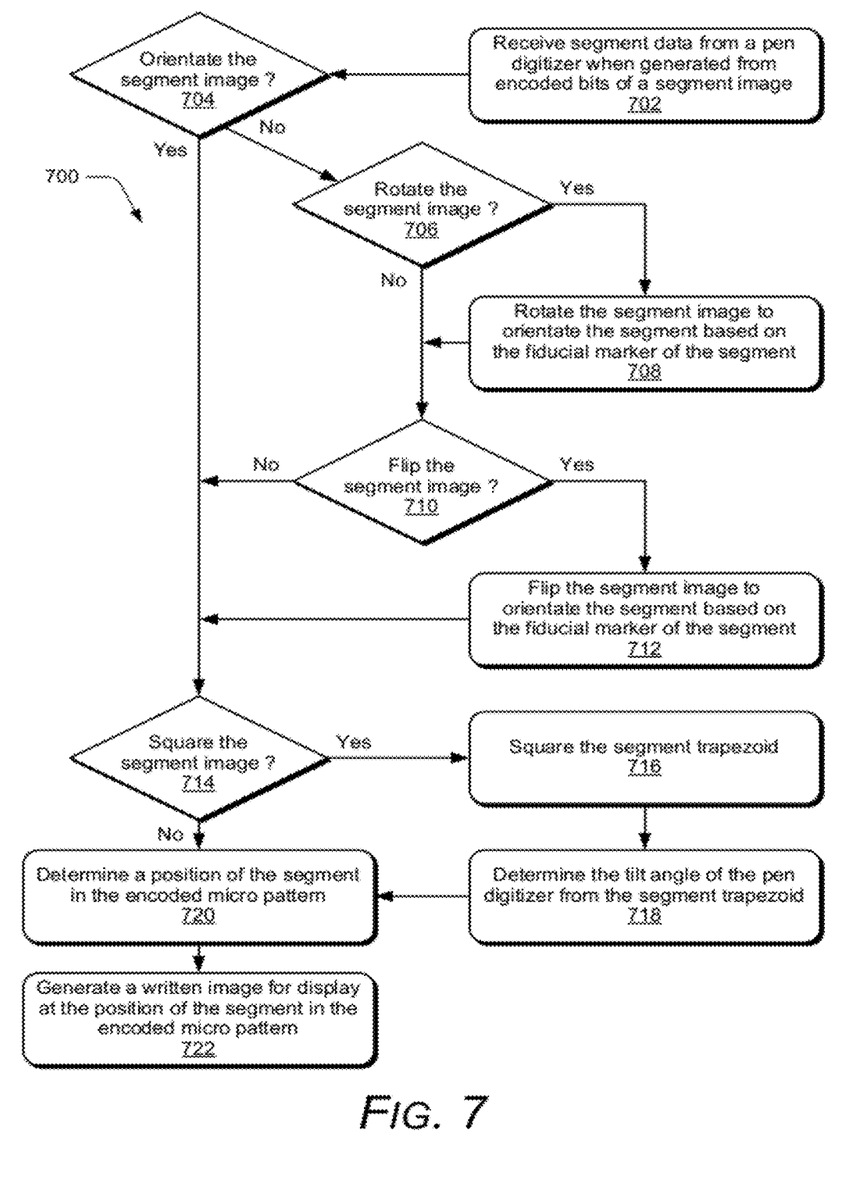

FIG. 7 illustrates example method(s) 700 of an encoded micro pattern and a pen digitizer, and is described with reference to a computing device that processes digitized images. The order in which the method blocks are described are not intended to be construed as a limitation, and any number of the described method blocks can be combined in any order to implement a method, or an alternate method.

At block 702, segment data is received from a pen digitizer that generates the segment data from a segment image of encoded bits in an encoded micro pattern. For example, the computing device 104 (FIG. 1) receives segment data from the pen digitizer 102, and the digitizer application 410 (FIG. 4) that is executed by the computing device processes the segment data.

At block 704, a determination is made as to whether the segment image is orientated for processing at the computing device. For example, the digitizer application 410 at the computing device determines whether the segment image is orientated based on a fiducial marker 216 (FIG. 2) that indicates an orientation of the segment 202 from which to determine the position of the segment in the encoded micro pattern.

If the segment image is not orientated for processing (i.e., "no" from block 704), then at block 706, a determination is made as to whether the segment image needs to be rotated to orientate the segment based on a fiducial marker. If the segment image is to be rotated (i.e., "yes" from block 706), then at block 708, the segment image is rotated to orientate the segment based on the fiducial marker. For example, the digitizer application 410 at the computing device rotates the segment image at 220 to orientate the segment based on the fiducial marker 216. If the segment image does not need to be rotated (i.e., "no" from block 706), or continuing from block 708, then at block 710, a determination is made as to whether the segment image needs to be flipped to orientate the segment based on the fiducial marker of the segment.

If the segment image is to be flipped (i.e., "yes" from block 710), then at block 712, the segment image is flipped to orientate the segment based on the fiducial marker. For example, the digitizer application 410 at the computing device flips the segment image at 218 to orientate the segment based on the fiducial marker 216. If the segment image does not need to be flipped (i.e., "no" from block 710), or continuing from block 712, or if the segment image is already orientated for processing (i.e., "yes" from block 704), then at block 714, a determination is made as to whether the segment image is to be squared. For example, the segment image of the segment 202 is optically-imaged as the segment trapezoid 206 when the pen digitizer is positioned at a tilt angle 208 with respect to a plane of the encoded micro pattern.

If the segment image needs to be squared (i.e., "yes" from block 714), then at block 716, the segment trapezoid is squared for processing of the segment image and, at block 718, the tilt angle of the pen digitizer is determined from the segment trapezoid. For example, the digitizer application 410 at the computing device squares the segment trapezoid to generate the squared segment image 224 so that the encoded bits are interpreted in a correct sequence or pattern to determine the (x,y) position of the segment in the encoded micro pattern. Additionally, the digitizer application determines the tilt angle 208 from the segment trapezoid 206 and/or calculates the tilt angle based on the transition from the segment trapezoid to the squared segment image.

If the segment image does not need to be squared (i.e., "no" from block 714), or continuing from block 718, then at block 720, a position of the segment in the encoded micro pattern is determined. For example, the digitizer application 410 at the computing device determines the position of the segment 202 in the encoded micro pattern 108 from the encoded bits of the segment image. At block 722, a written image is generated for display on a display device at the position of the segment in the encoded micro pattern. For example, the computing device generates a written image for display at 212 on the display device 214, and in embodiments, the written image is displayed with a parallax correction based on the tilt angle 208 of the pen digitizer.

Figure 8:
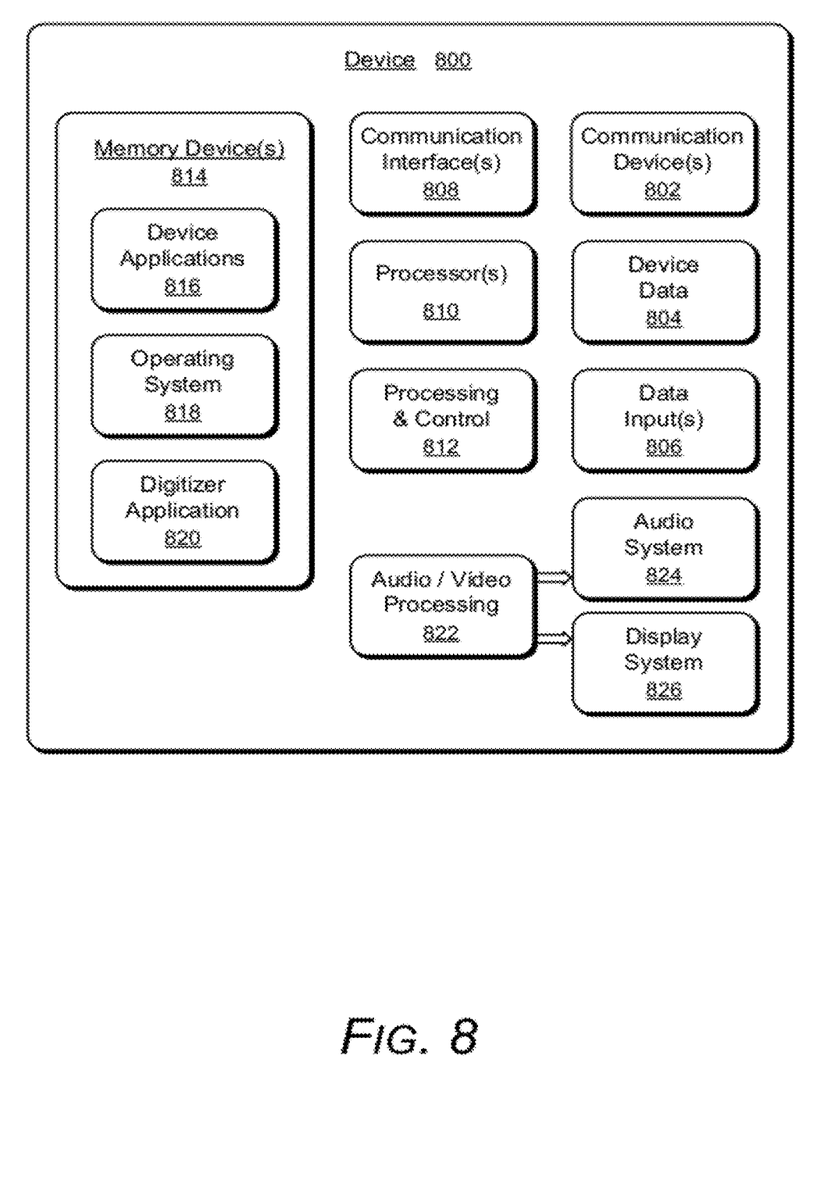
FIG. 8 illustrates various components of an example device that can implement embodiments of an encoded micro pattern and a pen digitizer.

FIG. 8 illustrates various components of an example device 800 that can be implemented as any of the devices described with reference to the previous FIGS. 1-7. In embodiments, the example device may be implemented as any one or combination of a fixed or mobile device, in any form of a consumer, computer, portable, user, communication, phone, navigation, television, appliance, gaming, media playback, and/or electronic device. The device may also be associated with a user (i.e., a person) and/or an entity that operates the device such that a device describes logical devices that include users, software, firmware, hardware, and/or a combination of devices.

The device 800 includes communication devices 802 that enable wired and/or wireless communication of device data 804, such as received data, data that is being received, data scheduled for broadcast, data packets of the data, etc. The device data or other device content can include configuration settings of the device, media content stored on the device, and/or information associated with a user of the device. Media content stored on the device can include any type of audio, video, and/or image data. The device includes one or more data inputs 806 via which any type of data, media content, and/or inputs can be received, such as user-selectable inputs, messages, communications, music, television content, recorded video content, and any other type of audio, video, and/or image data received from any content and/or data source.

The device 800 also includes communication interfaces 808, such as any one or more of a serial, parallel, network, or wireless interface. The communication interfaces provide a connection and/or communication links between the device and a communication network by which other electronic, computing, and communication devices communicate data with the device.

The device 800 includes one or more processors 810 (e.g., any of microprocessors, controllers, and the like) which process various computer-executable instructions to control the operation of the device. Alternatively or in addition, the device can be implemented with any one or combination of software, hardware, firmware, or fixed logic circuitry that is implemented in connection with processing and control circuits which are generally identified at 812. Although not shown, the device can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The device 800 also includes one or more memory devices 814 (e.g., computer-readable storage media) that enable data storage, such as random access memory (RAM), non-volatile memory (e.g., read-only memory (ROM), flash memory, etc.), and a disk storage device. A disk storage device may be implemented as any type of magnetic or optical storage device, such as a hard disk drive, a recordable and/or rewriteable disc, and the like. The device may also include a mass storage media device.

Computer readable media can be any available medium or media that is accessed by a computing device. By way of example, and not limitation, computer readable media may comprise storage media and communication media. Storage media include volatile and non-volatile, removable and non-removable media implemented in any method or technology for storage of information, such as computer-readable instructions, data structures, program modules, or other data. Storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by a computer.

Communication media typically embody computer-readable instructions or other data in a modulated data signal, such as carrier wave or other transport mechanism. Communication media also include any information delivery media. The term modulated data signal means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

A memory device 814 provides data storage mechanisms to store the device data 804, other types of information and/or data, and various device applications 816. For example, an operating system 818 can be maintained as a software application with a memory device and executed on the processors. The device applications may also include a device manager, such as any form of a control application, software application, signal processing and control module, code that is native to a particular device, a hardware abstraction layer for a particular device, and so on. In this example, the device applications 816 include a digitizer application 820. The digitizer application is shown as a software module and/or computer application. Alternatively or in addition, the digitizer application can be implemented as hardware, software, firmware, fixed logic, or any combination thereof.

The device 800 also includes an audio and/or video processing system 822 that generates audio data for an audio system 824 and/or generates display data for a display system 826. The audio system and/or the display system may include any devices that process, display, and/or otherwise render audio, video, display, and/or image data. Display data and audio signals can be communicated to an audio device and/or to a display device via an RF (radio frequency) link, S-video link, composite video link, component video link, DVI (digital video interface), analog audio connection, or other similar communication link. In implementations, the audio system and/or the display system are external components to the device. Alternatively, the audio system and/or the display system are integrated components of the example device.

Although embodiments of an encoded micro pattern and a pen digitizer have been described in language specific to features and/or methods, the subject of the appended claims is not necessarily limited to the specific features or methods described. Rather, the specific features and methods are disclosed as example implementations of an encoded micro pattern and a pen digitizer.

The invention claimed is:

1. A pen digitizer, comprising:
light guides configured coaxial within a housing of the pen digitizer to encircle an imaging tip of the pen digitizer, the light guides configured to focus light around the imaging tip of the pen digitizer through which encoded bits of a segment in an encoded micro pattern are imaged;
a photo array configured to optically image reflected light from the encoded bits as a segment image of the encoded micro pattern;
a digital signal processor configured to receive the segment image from the photo array and generate segment data that represents the encoded bits of the segment that is imaged; and
a transmitter configured to communicate the segment data to a computing device that generates a segment trapezoid based on the segment data and determines a tilt angle of the pen digitizer based on a transition from the segment trapezoid to a squared segment image.

2. A pen digitizer as recited in claim 1, wherein the digital signal processor is positioned perpendicular to the photo array in the housing of the pen digitizer.

3. A pen digitizer as recited in claim 1, wherein the photo array comprises a two-dimension imager array coupled to the digital signal processor.

4. A pen digitizer as recited in claim 1, wherein the transmitter is configured to communicate the segment data to the computing device that processes the segment data to determine a position of the segment in the encoded micro pattern based on the segment data.

5. A pen digitizer as recited in claim 1, wherein an interior diameter of the housing of the pen digitizer is approximately no larger than a diameter of a battery that powers the pen digitizer.

6. A pen digitizer as recited in claim 1, further comprising a light source that comprises one of an LED or an infra-red (IR) laser configured to generate the light.

7. A pen digitizer as recited in claim 1, wherein the light guides comprise fiber optics.

8. A pen digitizer as recited in claim 1, wherein the light guides comprise internal channels molded within the housing of the pen digitizer.

9. A pen digitizer as recited in claim 1, wherein the light guides are configured to refract the light to direct the light and illuminate the encoded micro pattern around the imaging tip of the pen digitizer, the light being refracted where the light exits a light guide.

10. A method interfacing a pen digitizer with a computing device, comprising:
receiving segment data from a pen digitizer that illuminates encoded bits of a segment in an encoded micro pattern, a position of the segment in the encoded micro pattern determinable from the encoded bits of the segment;
generating a segment trapezoid based on the segment data; and
determining a tilt angle of the pen digitizer based on a transition from the segment trapezoid to a squared segment image.

11. A method as recited in claim 10, wherein the pen digitizer includes a digital signal processor configured to generate the segment data that represents the encoded bits of the segment that is imaged, and said receiving the segment data from the digital signal processor of the pen digitizer.

12. A method as recited in claim 11, wherein the pen digitizer includes a photo array that comprises a two-dimension imager array coupled to the digital signal processor, the photo array configured to receive reflected light from the encoded bits to optically image the segment of the encoded bits as a segment image from the encoded micro pattern.

13. A method as recited in claim 10, further comprising determining a position of the segment in the encoded micro pattern based on the segment data.

14. A method as recited in claim 10, wherein an interior diameter of a housing of the pen digitizer is approximately no larger than a diameter of a battery that powers the pen digitizer.

15. A method as recited in claim 10, wherein the pen digitizer includes a light source that comprises one of an LED or an infra-red (IR) laser.

16. A pen digitizer system, comprising:
- an encoded micro pattern comprising segments of encoded bits, a position of each segment in the encoded micro pattern determinable from the encoded bits in a segment;
- a pen digitizer configured to optically-image the encoded bits in a segment and generate segment data from the encoded bits;
- a computing device configured to:
  - receive the segment data from the pen digitizer and process the segment data to determine a position of the segment in the encoded micro pattern;
  - generate a segment trapezoid based on the segment data; and
  - determine a tilt angle of the pen digitizer based on a transition from the segment trapezoid to a squared segment image.

17. A pen digitizer system as recited in claim 16, wherein the pen digitizer comprises:
- a digital signal processor configured to receive a segment image of the encoded bits and generate the segment data that represents the encoded bits of the segment that is imaged; and
- a transmitter configured to communicate the segment data to the computing device that is further configured to generate a written image for display on a display device at the position that corresponds to the segment.

18. A pen digitizer system as recited in claim 16, wherein the pen digitizer comprises:
- a light source configured to generate light that is focused around an imaging tip of the pen digitizer to illuminate the encoded bits of the segment in the encoded micro pattern; and
- a photo array configured to optically image reflected light from the encoded bits of the encoded micro pattern.

19. A pen digitizer system as recited in claim 18, wherein the pen digitizer further comprises:
- light guides configured coaxial within a housing of the pen digitizer to encircle the imaging tip of the pen digitizer, the light guides configured to transfer the light from the light source to focus the light around the imaging tip of the pen digitizer; and
- a lens configured to focus the reflected light from the encoded bits onto the photo array.

20. A pen digitizer system as recited in claim 18, wherein the pen digitizer further comprises fiber optics configured coaxial within a housing of the pen digitizer and configured to direct the light that illuminates the encoded bits of the encoded micro pattern.

* * * * *